(12) United States Patent
Engels et al.

(10) Patent No.: US 9,646,470 B1
(45) Date of Patent: May 9, 2017

(54) AIRCRAFT SYSTEMS AND METHODS WITH OPERATOR MONITORING

(71) Applicant: HONEYWELL INTERNATIONAL INC., Morris Plains, NJ (US)

(72) Inventors: Jary Engels, Peoria, AZ (US); Ivan Sandy Wyatt, Scottsdale, AZ (US); Aaron Gannon, Anthem, AZ (US)

(73) Assignee: HONEYWELL INTERNATIONAL INC., Morris Plains, NJ (US)

( * ) Notice: Subject to any disclaimer, the term of this patent is extended or adjusted under 35 U.S.C. 154(b) by 0 days.

(21) Appl. No.: 14/884,512

(22) Filed: Oct. 15, 2015

(51) Int. Cl.
*G08B 6/00* (2006.01)
*H04Q 9/00* (2006.01)

(52) U.S. Cl.
CPC ............. *G08B 6/00* (2013.01); *H04Q 9/00* (2013.01); *H04Q 2209/40* (2013.01)

(58) Field of Classification Search
CPC .......... G06F 3/016; G08B 6/00; G08B 21/04; G08B 25/01; G08B 25/10; H04Q 9/00
USPC ........ 340/407.1, 539.11, 582, 7.6, 945, 965; 116/200, 205; 463/30, 36; 701/23, 70
See application file for complete search history.

(56) References Cited

U.S. PATENT DOCUMENTS

| | | | |
|---|---|---|---|
| 6,144,619 A | 11/2000 | Reisman | |
| 6,273,371 B1 | 8/2001 | Testi | |
| 6,477,117 B1 | 11/2002 | Narayanaswami et al. | |
| 8,386,008 B2 | 2/2013 | Yuen et al. | |
| 8,552,847 B1 * | 10/2013 | Hill | G06F 3/016 116/205 |
| 8,696,357 B2 | 4/2014 | ALDossary | |
| 8,884,874 B1 | 11/2014 | Kim et al. | |
| 8,914,012 B2 | 12/2014 | Crosbie et al. | |
| 9,053,516 B2 | 6/2015 | Stempora | |
| 9,135,793 B1 | 9/2015 | Pfab et al. | |
| 2003/0094539 A1 | 5/2003 | Schaeffer et al. | |
| 2012/0139759 A1 | 6/2012 | Anders | |

(Continued)

FOREIGN PATENT DOCUMENTS

| | | |
|---|---|---|
| EP | 0204649 A1 | 12/1986 |
| WO | 2015090810 A1 | 6/2015 |

OTHER PUBLICATIONS

Devans T. et al, "Overcoming Information Overload in the Cockpit," West Point Operations Research Center, Jun. 25, 2015.

(Continued)

*Primary Examiner* — Hung T Nguyen
(74) *Attorney, Agent, or Firm* — Lorenz & Kopf, LLP

(57) ABSTRACT

A wearable device to be worn by an operator of an aircraft includes a communication unit configured to receive aircraft parameters from an aircraft system. The wearable device further includes a database configured to store adverse control rules that define at least a first adverse control associated with a first aircraft state. The wearable device further includes a first sensor to collect data associated with movement and/or location of the wearable device. The wearable device includes a processing unit configured to identify the first aircraft state based on the aircraft parameters, evaluate operator intent based on the movement and/or location of the wearable device, and initiate a first alert when the operator intent corresponds to the first adverse control during the first aircraft state. The wearable device includes a haptic unit configured to communicate the first alert to the operator.

20 Claims, 4 Drawing Sheets

(56) References Cited

U.S. PATENT DOCUMENTS

| | | |
|---|---|---|
| 2013/0054053 A1 | 2/2013 | Greenfield et al. |
| 2015/0003210 A1 | 1/2015 | Joung et al. |
| 2015/0062356 A1 | 3/2015 | Yoshikawa et al. |
| 2015/0092520 A1 | 4/2015 | Robison et al. |
| 2015/0149018 A1* | 5/2015 | Attard ............... G05D 1/0061 701/23 |
| 2015/0161876 A1 | 6/2015 | Castillo |
| 2015/0278498 A1 | 10/2015 | Hong et al. |

OTHER PUBLICATIONS

Extended EP Search Report for Application No. 16193403.9-1803 dated Mar. 24, 2017.

* cited by examiner

AIRCRAFT SYSTEMS AND METHODS WITH OPERATOR MONITORING

TECHNICAL FIELD

The present invention generally relates to aircraft systems and methods, and more particularly relates to aircraft systems and methods that provide operator monitoring.

BACKGROUND

Modern aircraft systems continue to advance in sophistication and complexity. As aircraft systems advance, the number of tasks required by flight crews to operate the aircraft in a safe and efficient manner also increases. As examples, flight crews typically monitor and interact with numerous types of systems associated with the aircraft, including communications systems, navigation systems, flight management systems, flight control systems, display systems, collision avoidance systems, weather systems, and radar systems. Given the number of systems and tasks, it may be challenging to maintain incident free operation. During certain aircraft states, improper control actuation by the operator has the potential to cause undesirable issues.

Accordingly, it is desirable to provide systems and methods to improve the efficiency and safety of operation. Furthermore, other desirable features and characteristics of the present invention will become apparent from the subsequent detailed description of the invention and the appended claims, taken in conjunction with the accompanying drawings and this background of the invention.

BRIEF SUMMARY

In accordance with an exemplary embodiment, a wearable device to be worn by an operator of an aircraft includes a communication unit configured to receive aircraft parameters from an aircraft system. The wearable device further includes a database configured to store adverse control rules that define at least a first adverse control associated with a first aircraft state. The wearable device further includes a first sensor to collect data associated with at least one of movement and location of the wearable device. The wearable device further includes a processing unit coupled to the communication unit, the database, and the first sensor. The processing unit is configured to identify the first aircraft state based on the aircraft parameters, evaluate operator intent based on the at least one of movement and location of the wearable device, and initiate a first alert when the operator intent corresponds to the first adverse control during the first aircraft state. The wearable device further includes a haptic unit coupled to the processing unit and configured to communicate the first alert to the operator.

In accordance with a further exemplary embodiment, a method is provided for monitoring an operator of an aircraft. The method includes receiving, on a wearable device worn by the operator, aircraft parameters from an aircraft system; identifying, with a processing unit of the wearable device, the first aircraft state based on the aircraft parameters; collecting, with a first sensor of the wearable device, data associated with at least one of movement and location of the wearable device; evaluating operator intent based on the at least one of movement and location of the wearable device in view of adverse control rules that define at least a first adverse control associated with the first aircraft state; initiating, with the processing unit of the wearable device, a first alert when the operator intent corresponds to the first adverse control during the first aircraft state; and communicating, with a haptic unit on the wearable device, the first alert to the operator.

BRIEF DESCRIPTION OF THE DRAWINGS

The present invention will hereinafter be described in conjunction with the following drawing figures, wherein like numerals denote like elements.

DETAILED DESCRIPTION

The following detailed description is merely exemplary in nature and is not intended to limit the invention or the application and uses of the invention. As used herein, the word "exemplary" means "serving as an example, instance, or illustration." Thus, any embodiment described herein as "exemplary" is not necessarily to be construed as preferred or advantageous over other embodiments. All of the embodiments described herein are exemplary embodiments provided to enable persons skilled in the art to make or use the invention and not to limit the scope of the invention which is defined by the claims. Furthermore, there is no intention to be bound by any expressed or implied theory presented in the preceding technical field, background, brief summary, or the following detailed description.

Broadly, exemplary embodiments described herein include aircraft systems and methods in which a wearable device communicates directly with aircraft data sources. In one exemplary embodiment, the wearable device determines operator intent based on the movement and location of the wearable device. The wearable device may further monitor a set of adverse control rules in view of operator intent and aircraft state, and upon the initiation of an inappropriate control for a particular aircraft state, the wearable device may communicate a tactile alert to the operator.

Figure 1:
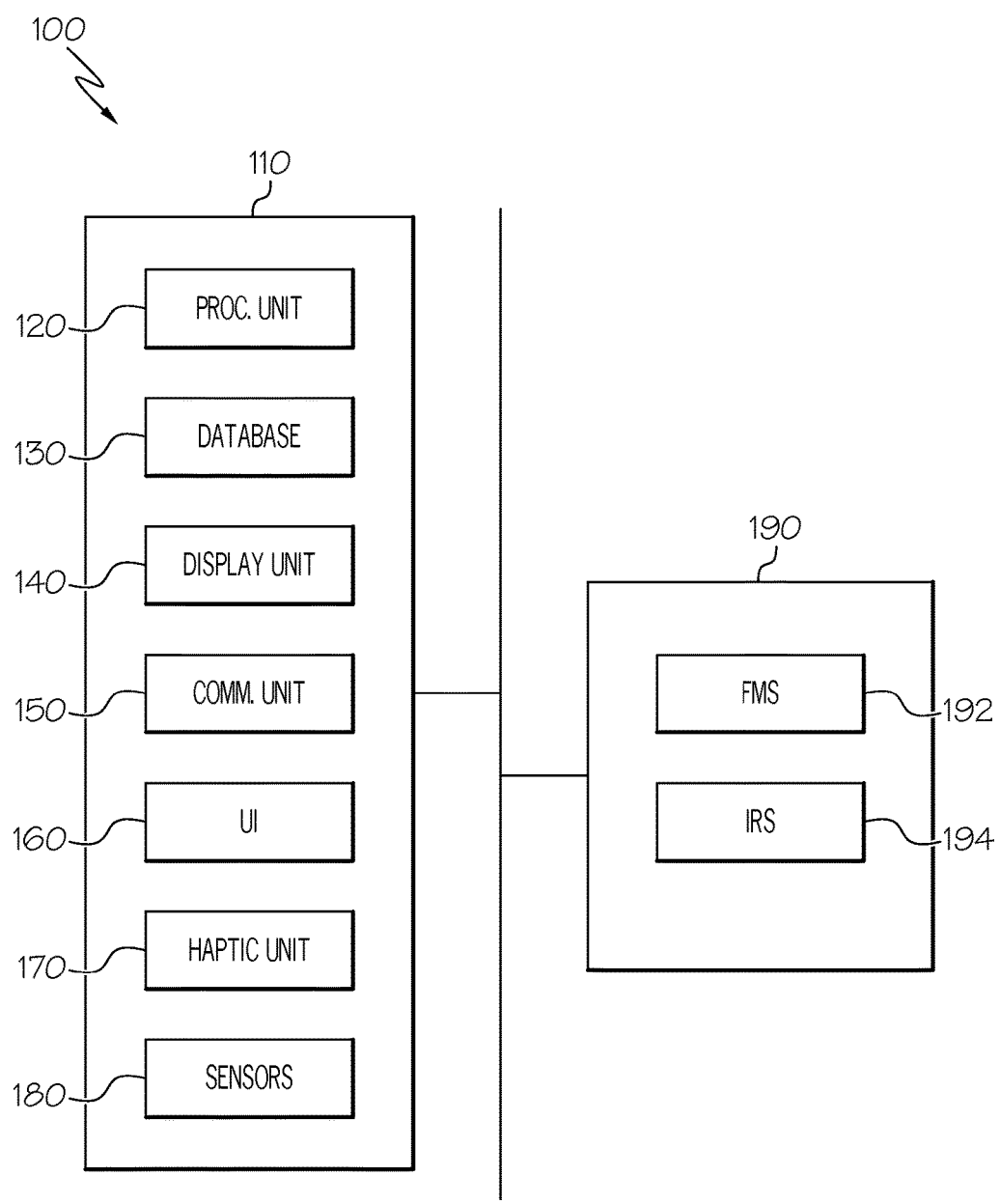
FIG. 1 is a schematic diagram of an aircraft system in accordance with an exemplary embodiment.

FIG. 1 is a schematic representation of an aircraft system 100 that includes a wearable device 110 that interacts with various aircraft systems and data sources 190. The components and subcomponents of system 100 may be coupled together in any suitable manner, such with as a data bus. Although the system 100 appears in FIG. 1 to be arranged as an integrated system, the system 100 is not so limited and can also include an arrangement whereby one or more aspects of the system 100 are separate components or subcomponents of another system located either onboard or external to the aircraft. As described below, the aircraft system 100 generally functions to provide alerts and other types of information to an operator (generally, a pilot or other member of a flight crew) on the wearable device 110.

Additional information about operation will be provided below after a brief introduction of each component.

Generally, the wearable device 110 is a personal device worn or carried by the operator. In one exemplary embodiment, the wearable device 110 is a watch, "smart watch", or "body monitor" that is attached or mounted on the wrist of the user, such an Apple or Android watch. Such devices 110 typically have the capability to interact with many types of systems, including smart phones and computer systems such that relative locations and orientations may be determined. Additional information regarding the form of the wearable device 110 is provided below with reference to FIGS. 2 and 3.

FIG. 1 depicts one example of architecture for describing the function and operation of the wearable device 110. Other arrangements or structure may be possible. As shown, the wearable device 110 includes a processing unit (or controller) 120, a database 130, a display unit 140, a user interface 150, a communication unit 160, a haptic unit 170, and sensors 180. In one exemplary embodiment, these components are collectively integrated into the wearable device 110, although in other embodiments, the various functions may be distributed or implemented by components outside of the wearable device 110. Although not specifically shown, the wearable device 110 may include a number of additional components that are common to watches and mobile devices. In one exemplary embodiment, the wearable device 110 may be worn on the arm of the dominant hand of the operator, while in other embodiments, wearable devices 110 may be worn on both arms. In some exemplary embodiments, the wearable device 110 may function to determine the operator arm on which the device 110 is positioned. Moreover, in some exemplary embodiments, the wearable device 110 may be incorporated or integrated into clothing, such as shirt cuffs.

Figure 2:
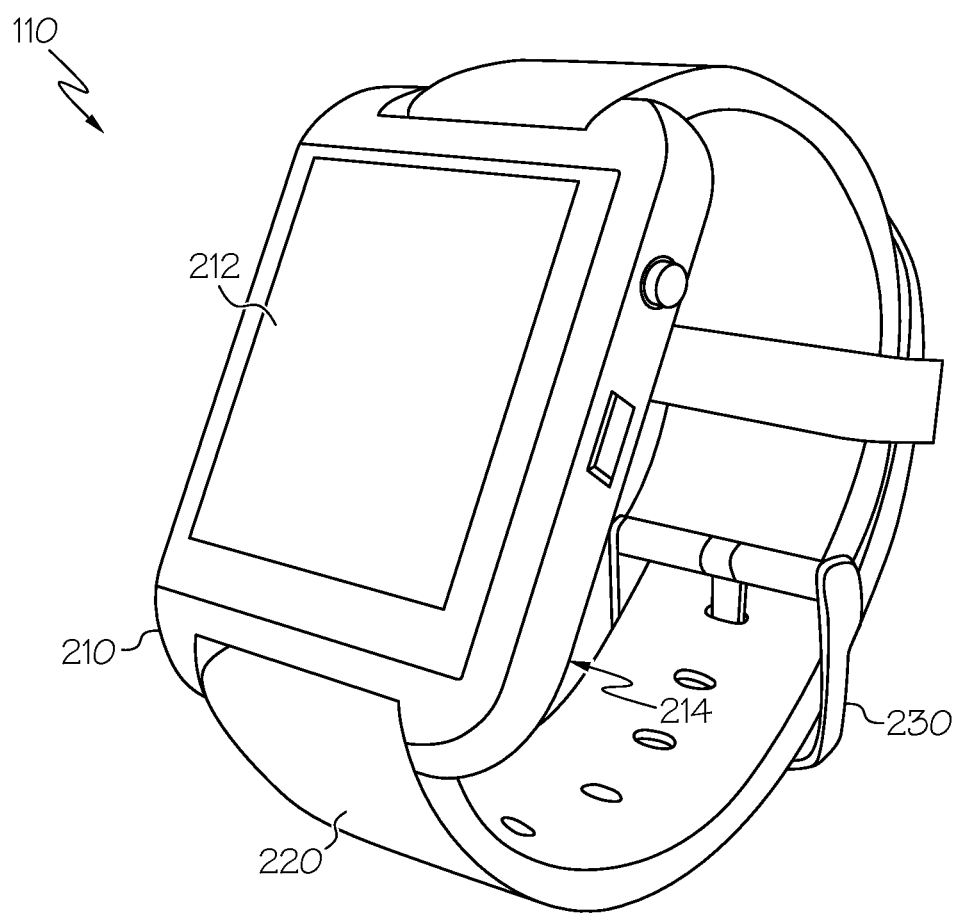
FIG. 2 is an isometric front view of a wearable device of the aircraft system of FIG. 1 in accordance with an exemplary embodiment.
Figure 3:
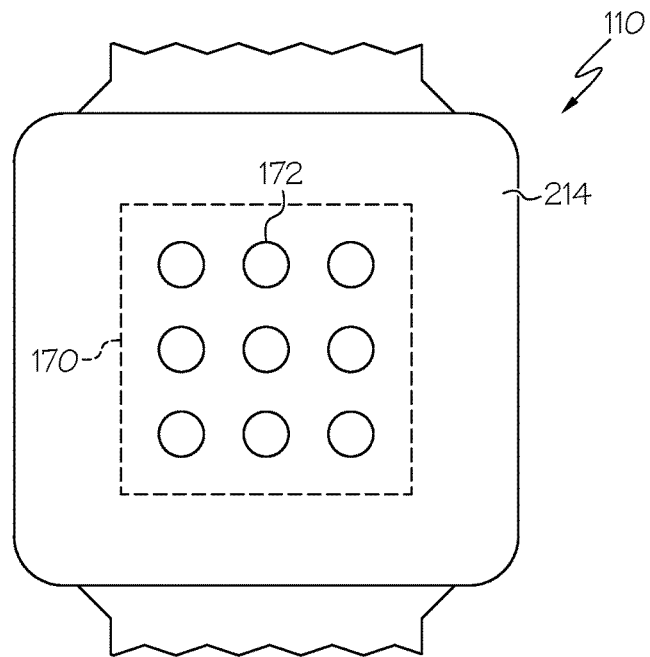
FIG. 3 is a partial rear view of a wearable device of the aircraft system of FIG. 1 in accordance with an exemplary embodiment.

Reference is briefly made to FIG. 2, which depicts a simplified view of an exemplary form of the wearable device 110 in accordance with an exemplary embodiment. As shown in FIG. 2, the wearable device 110 may include a case body 210 that at least partially houses the hardware and software components of the wearable device 110, including processing unit 120, database 130, display unit 140, user interface 150, communication unit 160, and haptic unit 170 shown in the schematic representation of FIG. 1. The case body 210 may be attached to a strap 220 with a buckle 230 for securing the wearable device 110 to the arm of the operator. In the view of FIG. 2, the front surface 212 of the wearable device 110 is visible. FIG. 3 depicts the rear surface 214 of the wearable device 110. Generally, the rear surface 214 is the side of the case body 210 that contacts the wrist or arm of the operator wearing the device 110. As schematically shown in FIG. 3, at least a portion of the haptic unit 170 is positioned at or near the rear surface 214. As described in greater detail below, the haptic unit 170 functions to provide a tactile signal to the operator wearing the device 110. In the depicted exemplary embodiment, the haptic unit 170 includes an array of haptic elements 172 that cooperate to output the tactile signal. The haptic elements 172 may be selectively actuated such that the tactile signal may have a directional component. For example, actuating the haptic elements 172 on one side of the rear surface 214 may function to discourage motion in that direction. In further embodiments, other configurations of haptic elements 172 may be provided to output a directional signal. Additionally, in some embodiments, only a single haptic element 172 may be provided. Although not shown, the haptic elements 214 may be incorporated into the interior surface of the strap 220. Additional details about the haptic unit 170 are provided below.

Returning to FIG. 1, in one exemplary embodiment, the processing unit 120 generally functions to at least receive and/or retrieve aircraft flight management and other operations information (generally, "aircraft parameters") from various sources, including the data sources 190 via communication unit 160. The processing unit 120 also receives data from the sensors 180 in order to monitor the position and movement of the wearable device 110, and thus, the hand of the operator in view of the position of the aircraft controls and the aircraft parameters, as discussed in greater detail below. Based on the results of this evaluation, the processing unit 120 may generate an alert for the operator via the haptic unit 170. The processing unit 120 may further generate display commands for display of operations information and/or alert information on the display unit 140. Additionally, the processing unit 120 may receive operator input via the user interface 150.

Depending on the embodiment, the processing unit 120 may be implemented or realized with a general purpose processor, a content addressable memory, a digital signal processor, an application specific integrated circuit, a field programmable gate array, suitable programmable logic device, discrete gate or transistor logic, processing core, discrete hardware components, or any combination thereof. In practice, the processing unit 120 includes processing logic that may be configured to carry out the functions, techniques, and processing tasks or methods associated with operation of the system 100.

The database 130 may include any suitable type of memory or data storage, such as for example, RAM, ROM, EEPROM, flash memory, optical or magnetic storage devices, or any other medium that can be used to store and access desired information, including information for operating the wearable device 110. As discussed in greater detail below, the database 130 may also store information associated with a set of adverse control procedures that are processed by the processing unit 120 to evaluate the intent of the operator in view of aircraft parameters and initiate alerts, as discussed in greater detail below. Additionally, the database 130 may store information associated with the flight deck, including a 3D or 2D model of the flight deck that defines the position of various type of aircraft controls.

The display unit 140 is coupled to the processing unit 120 for rendering information for the operator on the wearable device 110 in response to display commands generated by the processing unit 120. As is typical, the display unit 140 may be positioned on the front surface 212 (FIG. 2) of the wearable device 110 that is facing the operator. Any suitable type of display unit 140 may be provided, including an LCD unit, LED display unit, and/or OLED display unit.

The user interface 160 is coupled to the processing unit 120 to allow a user to interact with the other components of the wearable device 110, as well as other elements of the aircraft system 100. The user interface 160 may be realized as a keypad, touchpad, keyboard, mouse, touch panel, joystick, knob, line select key or another suitable device adapted to receive input from a user. In further embodiments, the user interface 160 is realized as audio input and output devices, such as a speaker, microphone, audio transducer, audio sensor, or the like. In some embodiments, the user interface 160 may be incorporated into the display unit 140. For example, in one embodiment, the user interface 160 may be integrated into the display unit 140 as a touchscreen and/or other mechanisms for function, display, and/or cursor control.

The communication unit 150 is coupled to the processing unit 120 and generally represents the combination of hardware, software, firmware and/or other components configured to support communications (e.g., send and/or receive information) between the wearable device 110 and the data sources 190, as well as other sources of information, such as, for example, using data link avionics, a data link infrastructure, and/or a data link service provider. In one exemplary embodiment, the communication unit 150 may incorporate or otherwise support a Wireless Application Protocol ("WAP") used to provide communications links to mobile computers, mobile phones, portable handheld devices and, connectivity to the Internet. Additionally, the communication unit 150 may support BlueTooth, radio, and other communications protocols, including IEEE 802.11 or other RF protocols. In one exemplary embodiment, the communication unit 150 communicates with other aircraft systems, particularly data sources 190 in accordance with an Aeronautical Radio, Incorporated (ARINC) protocol.

The haptic unit 170 is coupled to the processing unit 120 and generally represents one or more elements of the wearable device 110 that functions to produce a tactile signal, e.g., an alert. The haptic unit 170 may take one of numerous forms. For example, as introduced above, the haptic unit 170 may include one or more haptic elements 172 (FIG. 3) that vibrate or physically tap or "poke" the operator wearing the wearable device 110 with varying levels of strength, frequency, and pattern. As also discussed above, the haptic unit 170 may provide a directional component to the tactile signal in order to direct the operator toward an appropriate action and/or away from an inappropriate action. Although not shown, the processing unit 120 may further include other forms of alerts to the operator, such as a visual or audible warning on the display unit 140.

The sensors 180 are coupled to the processing unit 120 and generally represent the collection of sensors within the wearable device 110 that function to collect data associated with the position and motion of the wearable device 110. The sensors 180 may include, as examples, accelerometers and position sensors to determine the position, movement, and orientation of the wearable device 110. In some exemplary embodiments, the wearable device 110 may be considered to include or otherwise interact with components outside of the main body (e.g., case body 210 of FIG. 2). For example, the sensors 180 may be considered to include or otherwise interact with location or reference elements integrated in the flight deck. These elements may send signals that are received by the sensors 180 to assist the processing unit 120 in determining location. For example, the processing unit 120 may triangulate signals from more than one fixed element to determine location relative to the flight deck based on wireless or Bluetooth signals or use a dedicated location reference system to determine location relative to the flight deck. As such, in one exemplary embodiment, the sensors 180 within the wearable device 110 may collect data to determine location and movement within a flight deck relative to a stored 3D flight deck model as a reference frame, and therefore, within the actual flight deck; and in further embodiments, the sensors 180 may additionally or alternatively cooperate or utilize external reference points or transmitters within the flight deck to determine position and motion information.

The data sources 190 generally represent the aircraft systems and subsystems that provide information to the wearable device 110. In one exemplary embodiment, the data sources 190 include a flight management system (FMS) 192 and an inertial reference system (IRS) 194. Generally, the FMS 192 functions to support navigation, flight planning, and other aircraft control functions, as well as provide real-time data and/or information regarding the operational status of the aircraft. The FMS 192 may include or otherwise access one or more of the following: a weather system, an air traffic management system, a radar system, a traffic avoidance system, an autopilot system, a flight control system, crew alerting systems, electronic checklist systems, an electronic flight bag, and/or other suitable avionics systems. The WS 194 functions to continuously calculate the position, orientation, and velocity of the aircraft. Although not shown, additional types of data sources 190 may provide information to the wearable device 110.

The wearable device 110 discussed above refers to a single wearable device that is worn by a single operator. In some exemplary embodiments, one or more additional wearable devices may be incorporated into the system 100. Such additional wearable devices may have the same architecture and function as described above, and individual wearable devices 110 may have the same or different rule sets, for example, as a function of the position or identity of the person wearing the respective device.

Figure 4:
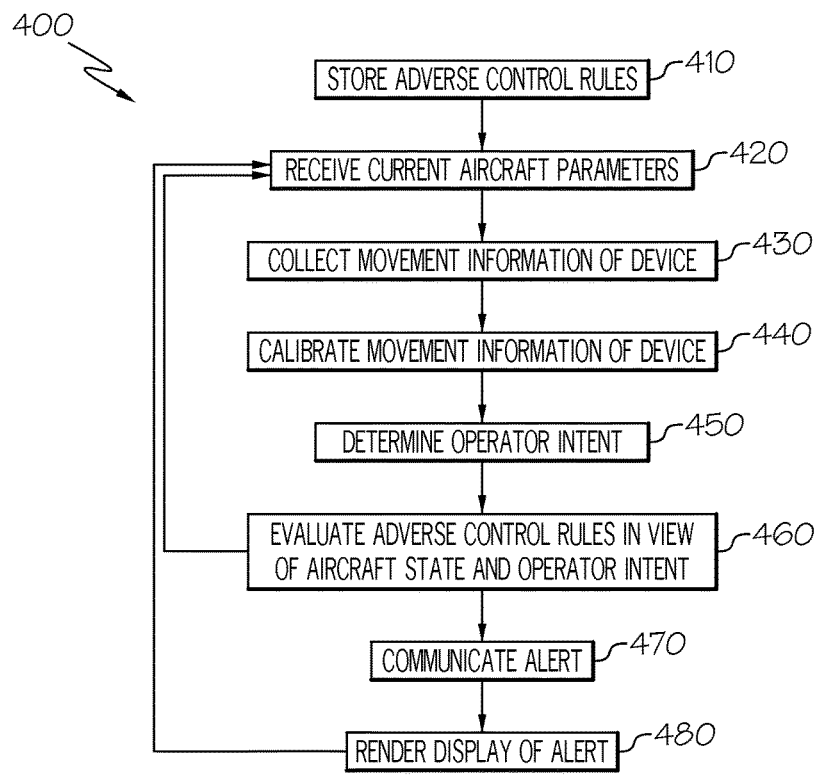
FIG. 4 is a flowchart representing a method for monitoring aircraft operators in accordance with an exemplary embodiment.

Operation of the system 100 will be described below with reference to FIG. 4, which is a flowchart representing a method 400 for communicating alerts to aircraft operators. The method 400 may be implemented with the system 100 of FIG. 1 and wearable device 110 of FIGS. 2 and 3, and as such, FIGS. 1-4 are referenced below. In one exemplary embodiment, the method 400 is typically implemented by an operator wearing the wearable device 110 during a flight operation.

In a first step 410, wearable device 110 stores a set of adverse control rules in database 130. The adverse control rules may be preloaded in the database 130 and/or entered by the operator via the user interface 150. In one exemplary embodiment, the adverse control rules may be created and/or modified via an application interface on the wearable device 110 or an associated processing system that communicates with the wearable device 110 to load the appropriate adverse control procedures. Generally, the adverse control rules include a collection of rules, each of which defines an aircraft state and adverse controls associated for each aircraft state. Generally, each adverse control represents an action by the operator that is inappropriate for the aircraft state, e.g., a "restricted" or "off-limit" control that should not be activated or modified based on the current state.

In one exemplary embodiment, the adverse control rules may have the following form: If [state] and [control intention], then [result]. The "state" may be the aircraft parameter or collection of parameters that represent a particular condition or state of the aircraft. The aircraft state can be defined based on any suitable parameter, including altitude-based conditions (e.g., above or below a threshold altitude), speed-based conditions (e.g., above or below a threshold speed), distance-based conditions (e.g., within a particular distance of a geographical location), time-based conditions (e.g., estimated travel time for reaching a particular reference location), directional conditions (e.g., the aircraft is located in a particular direction relative to a particular reference location), environmental conditions (e.g., temperatures/winds above/below a particular threshold), pressurization conditions (e.g., above or below a threshold pressurization), or other user-specific or aircraft-specific conditions.

The "control intention" may be considered to include a collection of inputs that represent a particular operator intention with respect to a particular control element (e.g., a lever, knob, switch, etc.). Operator intention may be based on position, movement, speed, acceleration, and orientation of the wearable device 110 relative to the location and/or configuration of the control element. For example, when the wearable device 110 is within a predetermined proximity (e.g., a predetermined distance) from a control element, and the wearable device 110 is moved towards the control element, it may be determined that the operator may intend to actuate that control element. Other examples that may indicate control intention include an initial acceleration toward a control element followed by a deceleration as the wearable device 110 approaches the control element. The sensitivity in determining control intention may be based on a number of factors, including the level of potential hazard if the control element is actuated in the respective condition and/or the likelihood of "nuisance" alerts considering the other types of control elements in the area around the respective control element.

The "result" refers to the haptic or tactile output via the haptic unit 170 and may be defined according to a number of parameters. Such parameters may include duration, frequency, pattern, intensity, directionality, and the like. In some exemplary embodiments, the result may include additional outputs, such as display signals for rendering information about the condition implicated by the adverse control rule on the display unit 140; display signals for rendering similar information on a cockpit display unit; and/or audible signals generated by the wearable device 110 or cockpit speaker element.

For example, if the aircraft state is defined according to speed, such as speeds greater than 250 knots, the operator should not actuate certain types of controls, such as controls for the landing gear. As another example, after landing, the operator should not retract the landing gear. In a further example, the operator should not activate the flaps at high speeds. Any type of adverse control scenario may be considered and incorporated into the adverse control rules. Examples of exemplary conditions and controls are provided below:

| State | Control |
| --- | --- |
| Predetermined Speed Range | Landing Gear |
| Predetermined Speed Range | Flaps |
| Engine Failure (L or R) | Engine, Propeller, or Mixture (R or L) |
| Non-normal Event | Generator (L or R) |
| Non-normal Event | Fuel Pump |
| Current or Impending Speed Limits | Throttle direction |

In one exemplary embodiment, the adverse control rules may be compiled based on aircraft limitations that have human interaction and physical movement components. In other words, the rules may be selected based on conditions in which human physical interactions with the aircraft have the potential to create undesirable situations. For example, the adverse control rules may be based on Section 2 of an Aircraft Flight Manual that provides the limitations required by regulation and/or safe operation of the aircraft, including airspeed limitations, powerplant limitations, weight and loading distribution limitations, and flight limitations. Further adverse control rules may be based on non-normal and emergency checklists, particularly with respect to actions requiring controls that are in close proximity to other controls and/or may be easily confused with other controls due to multiple controls of the same type (e.g., left, center, and right-specific controls).

In step 420, the processing unit 120 may retrieve and/or receive information associated with current aircraft parameters via the communication unit 160 to identify an aircraft state. The current aircraft parameters may be provided by, for example, the FMS 192 and IRS 194, although other avionics systems or aircraft computers may provide such information, including an Air Data Computer (ADC) and/or Avionics Standard Communication Bus (ASCB). For example, the altitude and airspeed may be provided by the ADC, and the ASCB provides the status and/or condition of any suitable state system (gear, flaps, etc) and data from various systems. The aircraft parameters and/or state may include, for example, the aircraft speed, altitude, and heading. Additional aircraft parameters may include equipment status, weather information, navigation information, and the like. These parameters may be received via the communication unit 150 of the wearable device 110 in a format that enables the processing unit 120 to extract the relevant parameter as an aircraft state for further processing.

In step 430, the processing unit 120 may retrieve and/or receive information associated with the position and movement of the wearable device 110 from the sensors 180. For example, internal accelerometers of the sensors 180 may provide data for the determining the magnitude and direction of movement of the wearable device 110.

In step 440, the processing unit 120 may calibrate the position and motion information from the sensors 180 with the current aircraft parameters in order to determine the position and motion of the wearable unit 110 relative to the flight deck. As a result of this step, the processing unit may remove motion data attributable to the overall aircraft (e.g., aircraft acceleration, turbulence, etc.) such that only movement of the wearable unit 110 relative to the operator and/or flight deck may be considered.

In step 450, the processing unit 120 may evaluate the intent of operator based on the movement of the wearable device 110. As noted above, the database 130 may store a model of the flight deck with the locations of one or more of the aircraft controls. The processing unit 120 considers the position of the wearable device 110, the position of the aircraft controls, and the movement of the wearable device 110 to evaluate the likelihood that the operator is in the process of reaching for a particular aircraft control or in the direction of a particular aircraft control. As noted above, this may be based on the position and location of the wearable device 110, as well as parameters such as speed, acceleration, and orientation of the wearable device 110.

In step 460, the processing unit 120 may evaluate the adverse control rules in view of the intent of the operator and the aircraft parameters. As noted above, the adverse control rules are stored in database 130 and define one or more adverse controls for various aircraft states.

In one exemplary embodiment, for a particular adverse control rule, the processing unit 120 determines if the current state satisfies the adverse control rule. If the current state renders the adverse control rule inapplicable, then the adverse control rule may be temporarily ignored. If the current state satisfies the adverse control rule, the processing unit 120 then determines if the intent of the operator implicates one or more of the adverse controls. In other words, the processing unit 120 evaluates whether or not the movement of the wearable device 110 indicates that the operator intends on actuating one of the adverse controls. If the processing unit 120 determines that the operator intends on actuating one of the adverse controls, thereby violating one of the adverse control rules, the processing unit 120 may initiate an alert, as discussed below.

Figure 5:
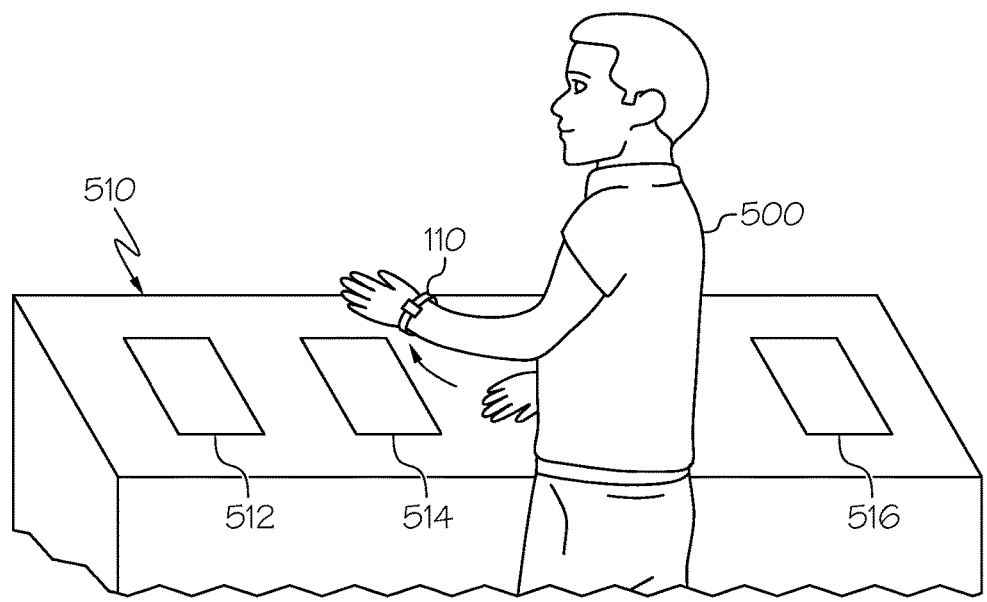
FIG. 5 is a view of an exemplary environment for the aircraft system of FIG. 1 in accordance with an exemplary embodiment.

Steps 450 and 460 are additionally demonstrated with reference to FIG. 5, which schematically depicts an exemplary scenario. In FIG. 5, an operator 500 wearing a wearable device 110 is positioned at a flight deck 510. The flight deck 510 includes a number of controls 512, 514, 516 that, upon actuation, control various aspects of aircraft operation. In some circumstances, actuation of a particular control 512, 514, 516 is inappropriate. As noted above, the adverse control rules define the adverse controls based on aircraft state. In the particular scenario of FIG. 5, controls 512, 51.4 are adverse controls based on the current state, while control 516 is not an adverse control. If, as shown, the wearable device 110 is moving towards controls 512, 514, the processing unit 120 may determine that the operator intends to actuate one of the controls 512, 514, and in response, initiates an alarm, as described below in subsequent steps. In an alternate scenario, if the processing unit 120 determines that the operator intends to actuate control 516, which is not an adverse control, or if no movement is detected, no alert would be initiated and the method 400 returns to step 420.

Returning to FIG. 4, during step 460, if the processing unit 120 establishes that the operator intent violates one of the adverse control rules, the method 400 continues to step 470 in which the haptic unit 170 may communicate an alert in the form of a tactile signal to the operator. As noted above, in one exemplary embodiment, the haptic unit 170 provides a vibration or tapping signal to the operator via the rear surface 214 (FIG. 3) of the device 110.

The nature of the tactile signal may be defined in the adverse control rules based on the particular aircraft state and/or adverse control. In some embodiments, the tactile signal may be the same for each adverse control such that, upon receiving the tactile signal, the operator stops or at least reconsiders the intended action.

In further exemplary embodiments, the tactile signal may have a directionality that provides an intuitive indication about the movement that implicates that adverse control. For example, the haptic unit 170 may have a vibration on one side that suggests a "wall" on the side of the adverse control such that the tactile signal intuitively moves the operator arm associated with the wearable device 110 away from the adverse control. As an example and again referring to the scenario in FIG. 5, as the operator reaches towards the adverse controls 512, 514, which are on the left of the operator 500, the haptic unit 170 may initiate a tactile signal on the left side of the wearable device 110, thereby suggestively urging the operator arm away from the adverse controls 512, 514. This tactile signal may be considered a "virtual tactile wall", "apparent tactile motion" or "simulated tactile guidance."

Figure 6:
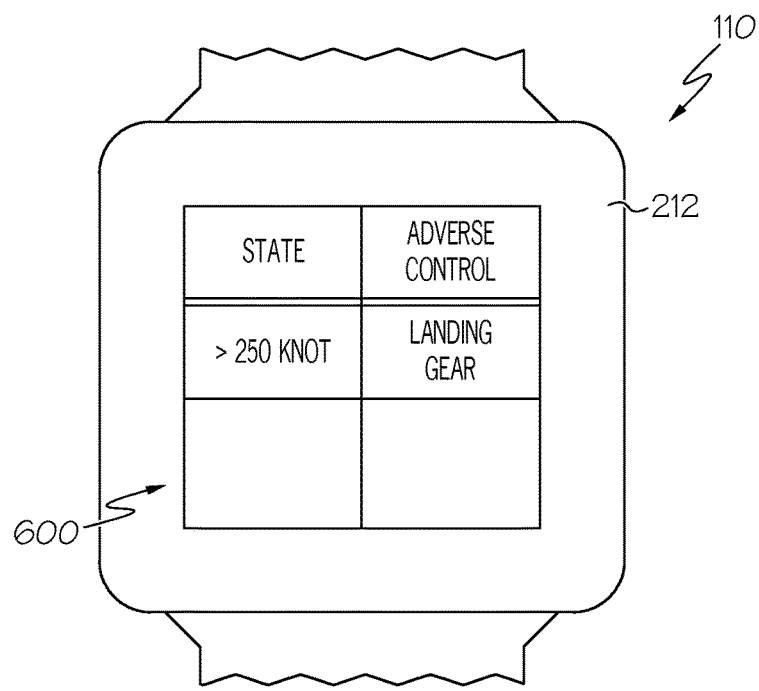
FIG. 6 is an exemplary display rendered by the aircraft system of FIG. 1 in accordance with an exemplary embodiment.

Returning to FIG. 4, in step 480, the processing unit 120 may generate display signals to display the aircraft state and adverse control intention that initiated the alarm. Reference is briefly made to FIG. 6, which is a display 600 that may be rendered on the display unit 140 of the wearable device 110. As shown, the display 600 includes a screen that depicts the aircraft state and the apparent adverse control. For example, the display 600 indicates that the operator appeared to actuate the gear control when the aircraft speed was above 250 knots, which violates one of the adverse control rules. As such, this provides the operator a record of inappropriate control movements for better situational awareness in future scenarios. In some exemplary embodiments, the processing unit 120 may further provide signals to the additional elements associated with the flight deck to provide audible or visual alerts.

Returning again to FIG. 4, the method 400 is generally iterative such that, upon communicating the signal in step 470, the processing unit 120 continues to monitor the intention of the operator in view of the aircraft state to avoid adverse control procedures in steps 420-480.

Accordingly, the exemplary embodiments discussed above provide improved systems and methods for communicating alerts to an aircraft operator. In particular, exemplary embodiments enable the creation and implementation of adverse control rules that specify various adverse controls for aircraft states. Further, exemplary embodiments include a wearable device that monitors operator intent and, upon a potentially adverse control, the wearable device generates a tactile signal to prevent the adverse control actuation. Since the wearable device is worn on the body of the operator, the operator is immediately aware of the signal. This signal may be structured to provide a virtual "wall" to communicate the limits of the adverse controls. Exemplary embodiments also provide a primary or redundant check on safety and operation procedures. As such, exemplary embodiments improve safety and efficiency of aircraft operation.

For the sake of brevity, conventional techniques related to graphics and image processing, navigation, flight planning, aircraft controls, and other functional aspects of the systems (and the individual operating components of the systems) may not be described in detail herein. Furthermore, the connecting lines shown in the various figures contained herein are intended to represent exemplary functional relationships and/or physical couplings between the various elements. It should be noted that many alternative or additional functional relationships or physical connections may be present in an embodiment of the subject matter.

Techniques and technologies may be described herein in terms of functional and/or logical block components, and with reference to symbolic representations of operations, processing tasks, and functions that may be performed by various computing components or devices. It should be appreciated that the various block components shown in the figures may be realized by any number of hardware, software, and/or firmware components configured to perform the specified functions. For example, an embodiment of a system or a component may employ various integrated circuit components, e.g., memory elements, digital signal processing elements, logic elements, look-up tables, or the like, which may carry out a variety of functions under the control of one or more microprocessors or other control devices.

While at least one exemplary embodiment has been presented in the foregoing detailed description of the invention, it should be appreciated that a vast number of variations exist. It should also be appreciated that the exemplary embodiment or exemplary embodiments are only examples, and are not intended to limit the scope, applicability, or configuration of the invention in any way. Rather, the foregoing detailed description will provide those skilled in the art with a convenient road map for implementing an exemplary embodiment of the invention. It being understood that various changes may be made in the function and arrangement of elements described in an exemplary embodiment without departing from the scope of the invention as set forth in the appended claims.

What is claimed is:

1. A wearable device to be worn by an operator of an aircraft, comprising:

a communication unit configured to receive aircraft parameters from an aircraft system;

a database configured to store adverse control rules that define at least a first adverse control associated with a first aircraft state;

a first sensor to collect data associated with at least one of movement and location of the wearable device;

a processing unit coupled to the communication unit, the database, and the first sensor, the processing unit configured to identify the first aircraft state based on the aircraft parameters, evaluate operator intent based on the at least one of movement and location of the wearable device, and initiate a first alert when the operator intent corresponds to the first adverse control during the first aircraft state; and a haptic unit coupled to the processing unit and configured to communicate the first alert to the operator.

2. The wearable device of claim 1, further comprising a watch housing that at least partially houses the communication unit, database, processing unit, first sensor, and haptic unit.

3. The wearable device of claim 1, wherein the haptic unit is configured to communicate the first alert as a tactile signal.

4. The wearable device of claim 3, wherein the haptic unit is configured to communicate the tactile signal as at least one of vibration and tap.

5. The wearable device of claim 3, wherein the haptic unit is configured to communicate the tactile signal as at least one of a virtual tactile wall, apparent tactile motion, and simulated tactile guidance.

6. The wearable device of claim 1, wherein the first sensor is an accelerometer.

7. The wearable device of claim 1, wherein the processing unit is further configured to evaluate the operator intent when the movement of the wearable device is towards the first adverse control.

8. The wearable device of claim 1, wherein the aircraft state is based on aircraft speed.

9. The wearable device of claim 1, wherein the aircraft state is based on aircraft altitude.

10. The wearable device of claim 1, wherein the haptic unit is configured to communicate the first alert with a directional component.

11. The wearable device of claim 10, wherein the haptic unit is configured to communicate the first alert with the directional component in a directional toward the first adverse control.

12. The wearable device of claim 1, wherein the communication unit is configured to receive the aircraft parameters according to an Aeronautical Radio, Incorporated (ARINC) protocol.

13. A method for monitoring an operator of an aircraft, comprising:

receiving, on a wearable device worn by the operator, aircraft parameters from an aircraft system;

identifying, with a processing unit of the wearable device, the first aircraft state based on the aircraft parameters;

collecting, with a first sensor of the wearable device, data associated with at least one of movement and location of the wearable device;

evaluating operator intent based on the at least one of movement and location of the wearable device in view of adverse control rules that define at least a first adverse control associated with the first aircraft state;

initiating, with the processing unit of the wearable device, a first alert when the operator intent corresponds to the first adverse control during the first aircraft state; and communicating, with a haptic unit on the wearable device, the first alert to the operator.

14. The method of claim 13, wherein the wearable device includes a watch housing that at least partially houses a communication unit for receiving the aircraft parameters, database for storing the adverse control rules, the processing unit, the first sensor, and the haptic unit.

15. The method of claim 13, wherein the communicating step includes communicating the first alert as a tactile signal.

16. The method of claim 15, wherein the communicating step includes communicating the tactile signal as a vibration.

17. The method of claim 13, wherein the collecting step includes collecting the data associated with the at least one of movement and location of the wearable device with an accelerometer as the first sensor.

18. The method of claim 13, wherein the identifying step includes identifying the first aircraft state based on aircraft speed and aircraft altitude as the aircraft parameters.

19. The method of claim 13, wherein the communicating step includes communicating the first alert with a directional component.

20. The method of claim 13, wherein the receiving step includes receiving the aircraft parameters from an aircraft system according to an Aeronautical Radio, Incorporated (ARINC) protocol.

* * * * *